Aug. 11, 1931.  E. GERMAIN  1,818,126
AUTOMOBILE ANTIGLARE LIGHTING SYSTEM
Filed May 18, 1927  3 Sheets-Sheet 1

Inventor
Ernest Germain

Aug. 11, 1931.  E. GERMAIN  1,818,126
AUTOMOBILE ANTIGLARE LIGHTING SYSTEM
Filed May 18, 1927  3 Sheets-Sheet 2
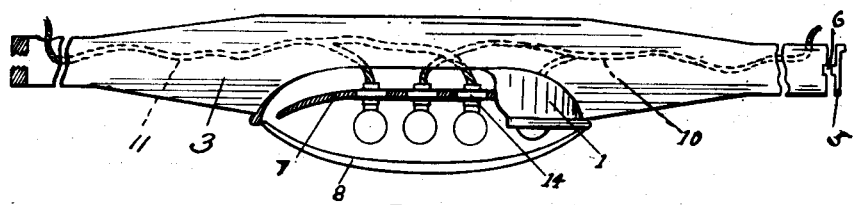
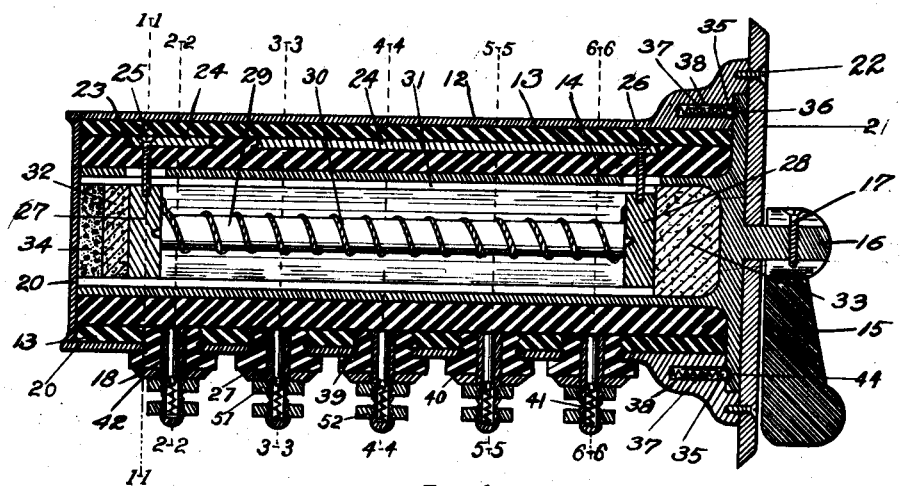
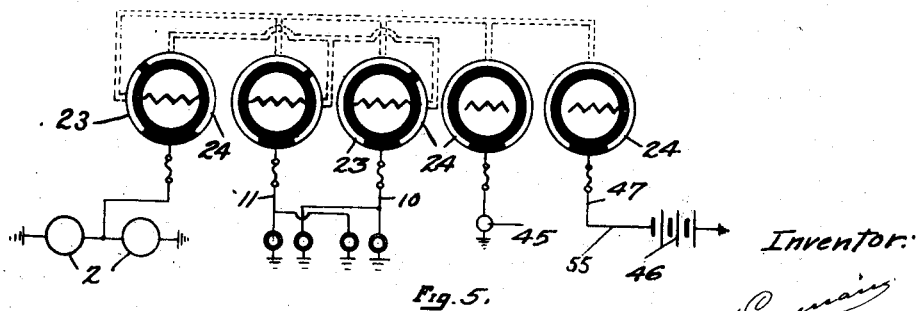

Aug. 11, 1931.                     E. GERMAIN                     1,818,126
                    AUTOMOBILE ANTIGLARE LIGHTING SYSTEM
                        Filed May 18, 1927        3 Sheets-Sheet 3

Inventor:

Patented Aug. 11, 1931

1,818,126

UNITED STATES PATENT OFFICE

ERNEST GERMAIN, OF MONTREAL, QUEBEC, CANADA

AUTOMOBILE ANTIGLARE LIGHTING SYSTEM

Application filed May 18, 1927. Serial No. 192,392.

This invention relates to an automobile lighting system devised for any classes of motored vehicles, and involves the use of an inverted lamp mounted in a position to brilliantly illuminate the wheels and the portion of the roadway between the wheels wherby a bright background is provided for the headlights, this reducing their glaring effect on the eye of an approaching motorist.

The new system is derived from an adaptation of inverted lamps disclosed in the copending application No. 700934, dated March 21, 1924, and designed to project a magnified light directly under the vehicle, inter-related to the two lights of the head lamps. Contrary to the ordinary purpose of other lamps projecting outwardly with the view of illuminating parts of the road, these invertel lamps are called to project an intensified light to the area confined between the wheels. The light in this way obtained, in a space as restricted as one between the frame of a car and the ground over which it is rolling, produces a magnified illumination of the entire wheel base, and is of such magnitude that the sight of the brightly illuminated wheels, coupled with the volume of the light, considerably absorbs the effect of glaring head lights; this object of the invention being well evidenced by the fact that the human eye will not fatigue at observing the clearly visible wheels of an oncoming car, but will find a rest for its vision, otherwise dazed by the glare of approaching head lights, or erred in the contrasting darkness of the night. Moreover, meeting cars are sometimes equipped with directive lights of anomalous projections, somehow conflicting with those in regular use, and the operators are but the more dazzled by the added strain imposed upon their eyes. In plainly showing the wheels, the new light decreases also the effects of perpendicular reflection of head lights in front of a car, one of the worst evil of night driving, caused by the head lights reflecting on the wet pavement of the highway in rainy weather; the same performance applying particularly when either of the head lamps should happen to be out of commission, thus removing the dangers of exposing the sides of the car to the miscalculation of other drivers with results frequently proved fatal. And by a far greater reaching importance is this new light to compare with any others, when its operating extends as much as to procure an absolute safety even in cases of vehicles should they be totally deprived of other lights.

The invention, while being subject to a multitude of embodiments, dwells entirely with the operation of this magnified light, precluding the glaring effect of head lights; the departure from previous automobile lighting practice, residing in the symmetrical and intense illumination, identifying the base of the wheels.

As described in the following specifications, further objects of the invention will be revealed through the detailed features of the co-operating switch of the system, made for the exclusive control of the magnified light and the express purpose of avoiding the unexpected flashes of bright head lights, unless being preceded by their proper intermediaries; this operation being usually abandoned to the varying practice of motorists and the cause of many accidents due to the ill-manipulation of dimmers and bright lights. This lighting system will thus afford a protection giving a sense of comfort and safety comparable to day driving, and will be found mostly useful in vehicles of extremely wide and long wheel bases, as in the class of motor trucks and autobusses, where lamps with display of colors or other auxiliaries are confusedly drawn on a winding road.

The invention is fully disclosed in the following description, and in the accompanying drawings in which:

A further object of my invention is to secure a simplified switch control for the conventional and the inverted lamps.

Other objects and advantages will appear throughout the specification and the appended claims.

Figure 3 is an elevation, partly in section of the inverted lamp, extending from a supporting member.

Figure 4 is a detailed cross section of the switch.

Figure 5 is a diagrammatical plan of the cylindric sections of the switch, related with the wiring of the lamps.

Figure 1:
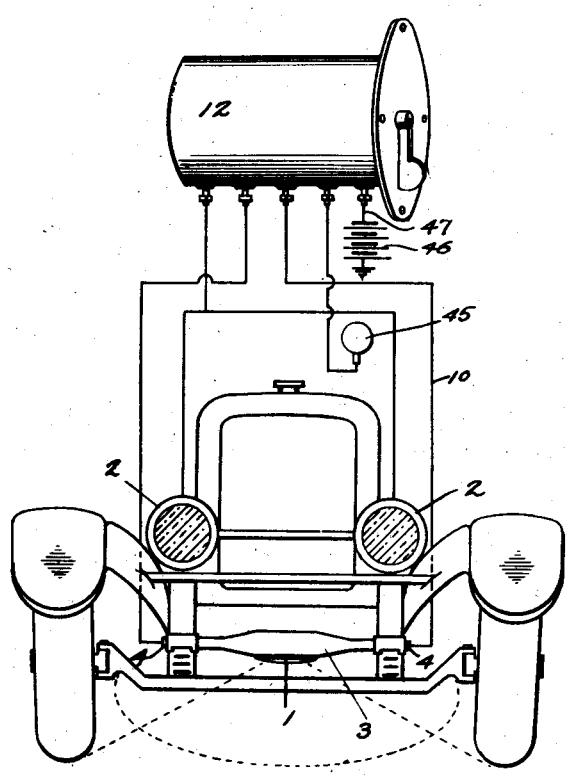
Figure 1 is a front elevation of an automobile with the lighting system attached.
Figure 2:
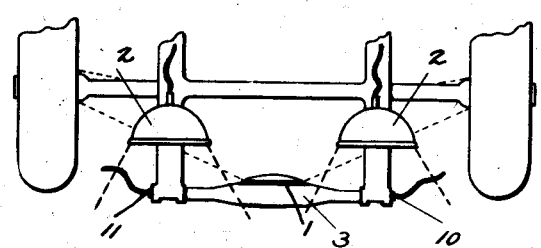
Figure 2 is a front top plan of an automobile with the disposition of the lamps.

Referring again to the drawings in which like reference numerals are indicating like parts, the disposition of the lamps is fully illustrated in Fig. 1, which shows an inverted lamp 1 preferably mounted between the front spring horns of the vehicle, at a level corresponding to the hidden lines of the under-frame. The inverted lamp being in this way located to reflect its rays of light upon the entire wheel base, is ideally disposed in close proximity of the head lamps 2, for upkeep as well as for maintenance. The inverted lamp 1, is made to extend from a supporting member 3, secured at each end by spring bolts 4; the support being held in its adjusted position by a lock 5 engaging into a recess 6 of the member, and a part of the lock engaging into the frame. The lamp encloses an elongated reflector 7 and a lens 8 of a magnifying power, providing a widespread and intense illumination of the wheels. The lamp sockets 9 extend from reflector 7, and the wires 10 and 11 which are respectively connected to the lamp sockets are led through the supporting member, to an opening adjacent each head lamp, where they are conducted along the frame to the switch 12 of the system.

The lamps, which may be effectively operated through any kind of switch providing the necessary connections, are preferably controlled by the switch disclosed which is specially designed for operation by an inexperienced person. The constituent parts of this device are reproduced in the corresponding figures of the drawings in which: Figure 4 presents a cylindrical casing 12, machined throughout and internally lined by an insulating sleeve 13; a cylinder 14 enclosing a resistance unit or dimmer is actuated by handle 15, secured on cylinder spindle 16 by screw 17, and adapted to rotate within the bearing surface of sleeve 13, to contact with brushes 18 of the hollow binding posts 19. The ends of the switch are respectively closed by a pressed in cover 20 and face plate 21, secured by screws 22.

Figure 8:
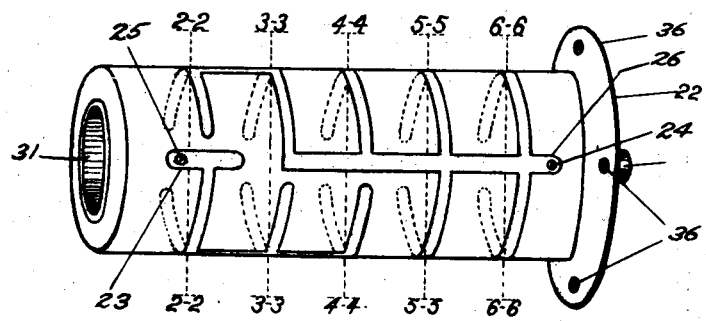
Figure 8 is a perspective plan of the switch cylinder, viewed from the top.

The particular function of the rotor is to divide and distribute the battery circuit in conformity with the requirements of the bright and dim lights of the system; this being performed through an internal connection of the ramified segments 23 and 24, imbedded in the insulated covering of the cylinder as illustrated in Figure 8; they are connected by properly isolated screws 25 and 26 to brass disks 27 and 28, supporting a porcelain rod 29, around which is wound the resistance wire 30 of German silver, soldered to each disk. The resistance unit is thus enclosed in the cylindrical rotor, which is internally lined by insulation 31, the ends being isolated by insulating fillers 32 and 33, and sealed by wax compound 34.

The selective positions of the rotor are regulated by the concerted action of four steel balls 35, depressing into recesses 36 from the exerted pressure of springs 37, compressed into cavities 38, and disposed 90 degrees apart in the circumference of casing 12.

Figure 6:
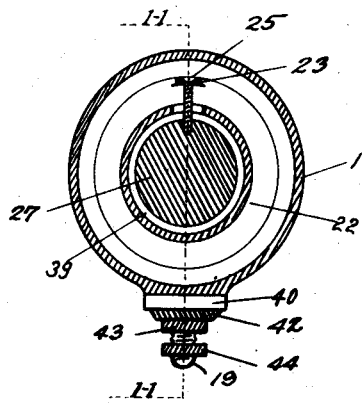
Figure 6 is a cross section of the switch Fig. 4, taken along the line 1—1.
Figure 7:
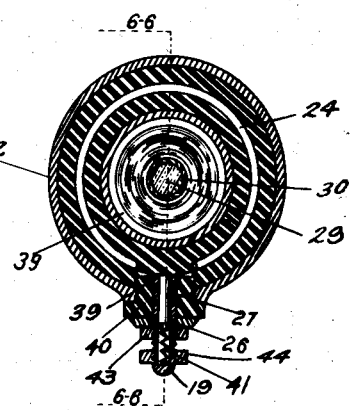
Figure 7 is a cross section of the switch Fig. 4 taken along the line 6—6.

Another illustration of the internal parts of the switch is given in Figures 6 and 7, taken on lines 1—1 and 6—6 of Figure 4 and shows the relative positions of the contacting brushes 18 with the neutral stay of the rotor. Binding posts 19 are made of hollow screws with tiny shoulders 39; they are pressed into insulating bushings 40, which in turn are threaded and screwed in the main casing 12 as well as in the lining sleeve 13; pressure to the brushes is applied by springs 41, which are silver plated for heat resisting properties, and compressing into the hollow of the posts, the external parts of which are terminated by washers 42 and binding nuts 43 and 44.

Figure 9:
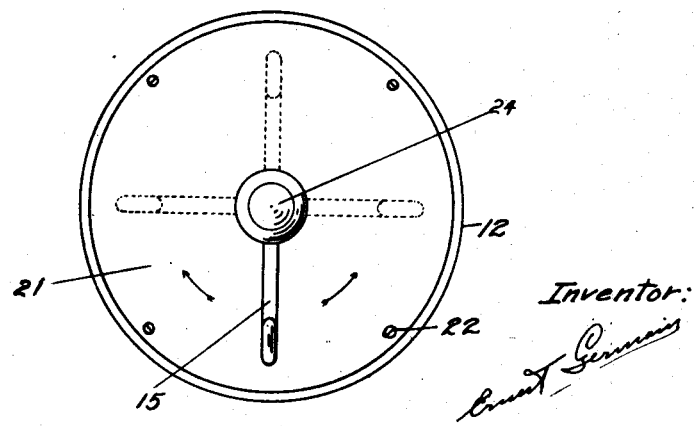
Figure 9 is a front elevation of the switch.

The operation of the device will be further explained by reviewing the diagrammatic plan of Fig. 5, which shows the divided sections of the rotor segments 23 and 24, individually related with the wiring of the lamps. It will be observed that each of these sections are taken on lines 2—2, 3—3, 4—4, 5—5 and 6—6 of Fig. 4, harmoniously demarcating the center of each segment branch encircling the rotor as shown in Figure 8. A closer study of the plan will disclose the remarkable resemblance of section, line 5—5, with battery section, line 6—6, as contributing to an unchanged circuit for delivery of light to the conventional dash and tail lamp 45, and will not need any further description. The identical likeness of section, line 3—3 to section, line 4—4 will also be found to belong to the same performance of a double line of supply of the inverted light. The plan is conceivedly drawn to the neutral position of the switch, when the rotor recesses 36 are conjointly engaging the steel balls 35 with handle 15 vertically down, (Fig. 9) and the brushes of the binding posts resting against the insulated gaps between the ends of each segment branch as in Figures 6 and 7. These gaps are of uniform width, but with the exception of one in section, line 2—2, leading to the head lamps and which is noticeably wider than at any other branch; this peculiarity existing for a retarded operation of these lamps, and to provide one of the many safety appliances of the system, being to permanently illuminate the base of the wheels of a vehicle, in timely advance of the head lights from either rotation of the switch.

Upon turning the rotor in a clockwise rotation, the current of battery 46 flows through wire 47 connected to the binding posts of section, line 6—6. From this rotation and by the contact of the brushes with segment 32, the circuit is simultaneously received in the rotor and distributed through the other sections to all the lamps. Through being operated by a single action of handle 15, each quarter revolution of the rotor sections, other than the neutral point and regulated by pressure of springs 45, Figure 7, presents a varied disposition of the segments, and transmits three different combinations of lights to the head lamps and the inverted lamps. This combined change of light is effected for one set of lamps, independently to the other; the illumination remaining constant from either set of lamps when the rotor is turned in either way.

The first combination is one of the three bright lights, and should be of the most convenient adaptation to be used on speeding highways, with the full display of the magnified light and the two bright lights of the head lamps. As the rotor turns with the handle moving from the left side, upward, segment 23 heretofore neutral in the first depression is brought into play in section, line 2—2 changing the head lights from bright to dim; its circuit being taken through the resistance unit and component parts, Fig. 4. In this instance, the circuit in sections, lines 3—3 and 4—4 which are still served by segment 24, is still giving an undisturbed magnified light to the inverted lamp, remaining to contrast resplendently with the two dim lights of the head lamps; this second combination, finding its highest efficiency when driving through villages and towns of the main road, or other lighted arteries. The third combination is coincident with the right depression of the switch, and is of three dim lights; this latter function being of a certain advantage with the coercive use of the magnified light, to eliminate unnecessary bright patches on streets of well illuminated cities. In this position of the rotor, offering its left side exposed to the contact of the brushes, the circuit in sections lines 2—2, 3—3 and 4—4 is exclusively transmitted by segment 23, of the lower voltage; the bright magnified light having changed into a dull illumination of the wheels, while the head lights are remaining steadily dimmed, from the time of the second depression of the switch.

By examining more particularly the details of the rotor in Fig. 11, it will be noted that the reversing action of the switch does not imply a different method of lighting, but merely reverts to a similitude of changes.

The device, while being the vital instrument of the system as a preventive of accidents, is not a complex embodiment of intricated parts; its cylindrical rotor, enclosing the resistance unit, is simply a covering of ebonite, poured around a skeleton form of segment. By removing the face plate, which is only fastened by four screws, all of its internal parts can be easily examined. The additional lights required for the intense illumination of the wheels are neither to be found incumbent on the resource energy of the battery, the current consumption being comparatively small, when figured with the night driving percentage of the average car.

It is not contemplated that the invention is bound to remove other customary methods of reducing the glare of head lights, or allow the use of lights not conforming with the law, but is only aimed to a practical mean of security to lessened causes for accidents and to overcome the state of uneasiness, generally felt when meeting cars at night.

Having thus fully described the invention what I claim as new and desire to protect by Letters Patent, is:

1. A lighting system for automobiles equipped with forwardly projecting headlights comprising an elongated lamp positioned between and below said headlights, and adapted to simultaneously direct its rays downwardly to the sides and rearwardly and unitary switch means for controlling the operation and the relative intensity of said lights and said lamp whereby the glaring effect of said headlights is reduced.

2. A lighting system for automobiles equipped with forwardly projecting headlights, comprising an oblong elongated lamp mounted between the forward extremities of the underframe and adapted to simultaneously direct its rays of light over the base of each wheel.

3. A lighting system for automobiles equipped with forwardly projecting headlights, comprising a hollow member horizontally mounted between the forward extremities of the underframe of a vehicle, an elongated frame centrally expanded to provide a housing, and a lamp mounted in said housing and adapted to simultaneously direct its rays of light over the base of each wheel and parallel with the road-bed.

4. In combination with an automobile having forwardly projection headlights, an oblong elongated lamp for reducing the glare of said headlights, supported through its opposed ends between the forward extremities of the underframe of said automobile and having a window to simultaneously project the rays of said lamp over the base of each wheel and parallel with the road-bed.

5. In combination with an automobile having forwardly projecting headlights, a lamp for reducing the glare from said headlights, horizontally supported through its opposed ends between the forwardly projecting portions of the underframe of said automobile, and extending abreast of said headlights and adapted to direct its rays of light over the base of each wheel and parallel with the road-bed whereby to oppose the rays emanating from said forwardly projected headlights.

Signed at Montreal this fourteenth day of May, 1927.

ERNEST GERMAIN.